Patented Jan. 8, 1924.

1,479,790

UNITED STATES PATENT OFFICE.

ALEX B. DAVIS, OF CINCINNATI, OHIO, ASSIGNOR OF ONE-HALF TO GEORGE CHAMBERLAIN, OF DECATUR, ILLINOIS.

EVAPORATION-PREVENTING MANTLE.

No Drawing. Application filed May 19, 1923. Serial No. 640,273.

*To all whom it may concern:*

Be it known that I, ALEX B. DAVIS, a citizen of the United States, and a resident of Cincinnati, in the county of Hamilton and State of Ohio, have invented certain new and useful Improvements in Evaporation-Preventing Mantles, of which the following is a full, clear, and exact description.

My invention relates to the forming of mantles of permanent or semi-permanent foam upon the surfaces of liquids which tend to evaporate.

In the storage of gasoline and other volatile oils as one particular instance of the value of my invention, there is a great annual loss due to the evaporation of the liquid while stored in large tanks. Furthermore with volatile oils, the filling of the vacant portion of the tanks with a mixture of gas and air forms a very explosive mixture, making oil storage tanks a menace. There are great losses in crude oil by evaporation of its constituents, and there are many other cases where foam mantles are of value.

It is my object to provide a foam producing material whereby a foam mantle may be formed on the surface of gasoline or other liquids, which foam is highly resistant to the passage therethrough of products of evaporation, and which is very permanent, and floats on the surface thereby forming no interference with the draining of the container in which it is used.

The property of a suitable foam, to act as an evaporation resistant mantle was not discovered by me, and glycerine and salts of hygroscopic character have been used together with other products to form foam mantles, previous to my invention.

The limited supply of glycerine has prevented, however, the wide spread use of such mantles, and my invention is directed to the production of such mantles with other materials.

Thus I have found that the glycols form a valuable foam producing agent, in place of glycerine. There are two glycols available, the first known as trimethylene glycol, a manufacturing by-product, and the second known as propylene glycol, which can be produced synthetically in large quantities at a low price, although it is not today a waste product such as the trimethylene glycol, which is customarily permitted to run off with waste waters, where produced as a by-product. Either of these glycols will be very effective in forming mantles.

In making up a preferred mantle the hygroscopic salt in solution is mixed with glucose and starch, the glycols added, and the mixture blown into a foam which is projected onto the surface of the liquid to be protected. Oil vapors do not readily impregnate the foam mantle so produced, and the mantle floats on the liquid surface for long periods of time without deterioration.

Usually the main body of the foam will be starch sugar, as it is readily obtainable and cheap. Starch and many water soluble gums, however, may be added if found convenient and cheap, it being preferred that a substance of colloidal nature be employed as this aids in the production of the foam. Thus solutions of gum arabic tragacanth, or other similar gums which are water soluble may be used.

I find also, that soaps of various characters, particularly castor oil soap, may be used in place of some of the glycol, which in some localities might reduce further the cost of the mantle forming materials. In my claims that follow, I desire to cover the materials included in their statement, whether other materials are added or not.

Having thus described my invention, what I claim as new and desire to secure by Letters Patent, is:—

1. A foam mantle for the purpose described, formed by a blown mixture of a starch sugar, a hygroscopic salt, and a glycol.

2. A foam mantle for the purpose described, formed by a blown mixture of colloidal substances, a hygrosopic salt, trimethylene glycol and starch sugar.

3. A foam mantle for the purpose described, formed by a blown mixture of starch sugar, starch, hygroscopic salt solution and glycol.

4. A foam mantle for the purpose described, formed by a blown mixture of starch sugar, hygroscopic salt solution, and trimethylene glycol.

5. A protective mantle for the purpose described, formed by a blown mixture of a colloidal substance, an aqueous vehicle, hygroscopic salt, glycol and soap.

6. A process of producing a protective mantle for oil tanks, which consists in blowing with air and depositing upon the surface of a liquid to be protected, a mixture of a starch derived sugar, hygroscopic salt, an aqueous vehicle, and glycol.

7. A process of producing a protective mantle for oil tanks, which consists in blowing with air and depositing upon the surface of a liquid to be protected, a mixture of a starch derived sugar, a hygroscopic salt, an aqueous vehicle, and a glycol, together with a soap.

ALEX B. DAVIS.